June 9, 1931.  T. D. BOWES  1,809,545
APPARATUS FOR FINISHING BEARINGS AND BUSHINGS
Filed July 5, 1928
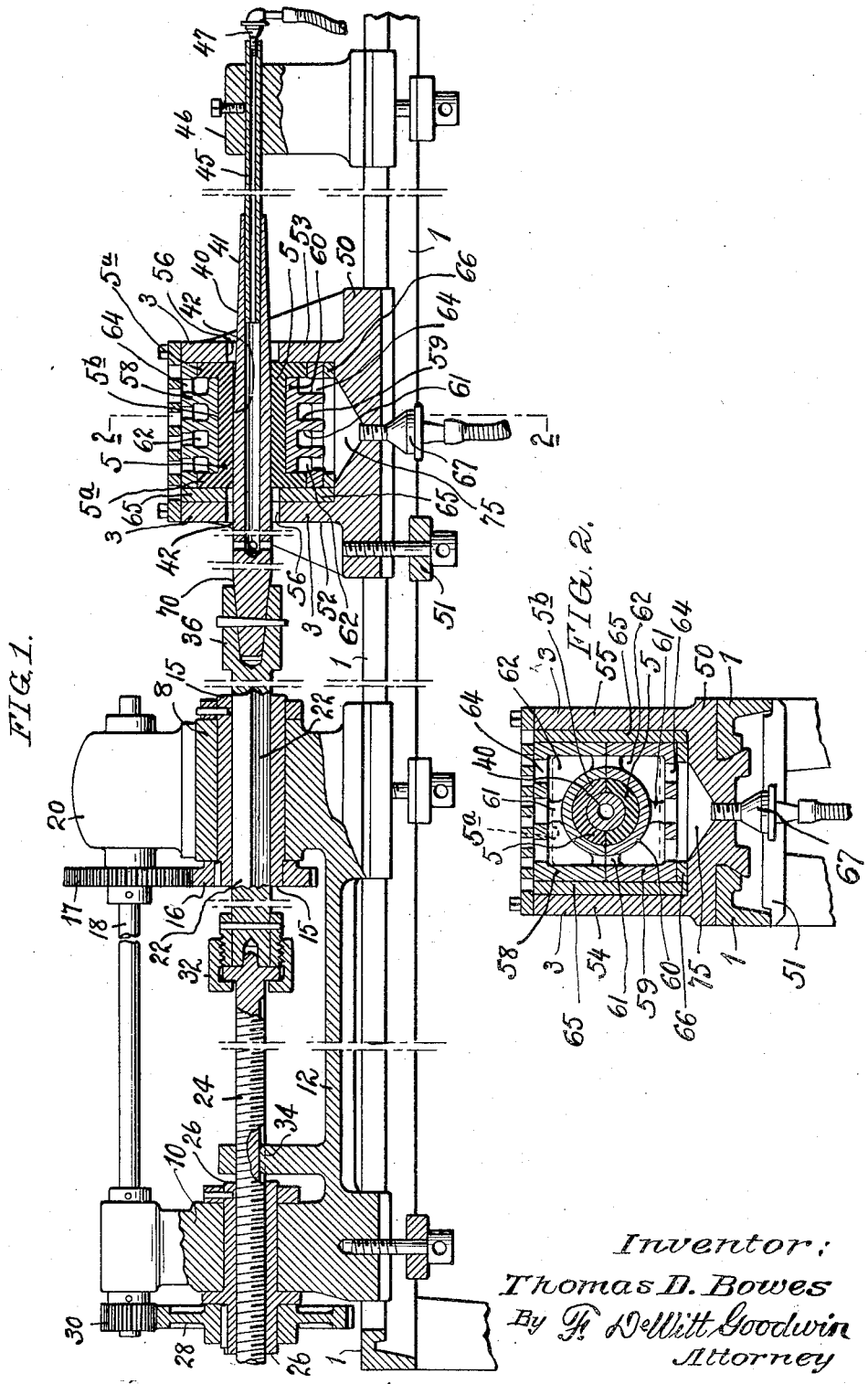
Inventor;
Thomas D. Bowes
By F. DeWitt Goodwin
Attorney Patented June 9, 1931

1,809,545

UNITED STATES PATENT OFFICE

THOMAS DAVID BOWES, OF CYNWYD, PENNSYLVANIA

APPARATUS FOR FINISHING BEARINGS AND BUSHINGS

Application filed July 5, 1928. Serial No. 290,679.

My invention relates to the apparatus for finishing bearings, and bushings for bearings, formed of metal such as are now in general use.

Bearings and bushings of this type are now manufactured in such sizes that the central opening forming the bearing surface of the bearing or bushing is of smaller diameter than that desired in the finished bearing, thus requiring the bearing or bushing to be bored or scraped to the size corresponding to the size of the shaft which is to be mounted in the bearing. Bearings and bushings of this type are frequently defective due to open or porous spots formed in the metal during the casting of the same. Hereinafter the term bearing will be understood to include bushings, brasses and bearing linings.

The object of my invention is to provide a finished bearing having a bearing opening of such a diameter that it will receive a shaft of a corresponding diameter, thus saving the labor of boring and scraping each individual bearing at the time it is installed in a machine; a further object is to compress the metal of which the bearing or bushing is formed, thereby eliminating the porous or soft spots from the metal; a still further object of my invention is to heat the metal of the bearing to a temperature somewhat below the melting point of the metal of which the bearing is formed; and a still further object is to provide a heated mandrel for burnishing or finishing the bearing; and a still further object is to provide a smooth conical mandrel for finishing the bearing, together with suitable means for operating the mandrel and for holding the bushing during the finishing operation of the latter. These together with various novel features of construction and arrangement of the parts, which will be more fully hereinafter described, constitute my invention.

Referring to the accompanying drawings, Fig. 1 is a central longitudinal vertical sectional view of an apparatus for carrying out my novel invention of finishing bearings and Fig. 2 is a transverse vertical section on line 2—2 Fig. 1.

In the accompanying drawings in which like reference characters refer to like parts 1 represents the bed plate of a machine, in the nature of a lathe bed, adapted for carrying out my invention. Adjustably mounted upon the bed plate 1, is a clamp member or box 3 adapted for holding a bearing 5 in a fixed position adapted to be operated upon.

Bearing blocks 8 and 10 are mounted upon the bed plate 1 and are preferably secured together by a rigid connecting member 12 whereby said blocks may be adjusted longitudinally upon the bed plate, as a single unit. The bearing block 8 is provided with a sleeve 15 which is loosely mounted in said block and provided at one end with a gear wheel 16, which meshes with a gear wheel 17, upon a shaft 18, driven by a motor 20, preferably secured upon the bearing block 8 and adapted for rotating the sleeve 15. A square shaft 22 is slidably mounted in the sleeve 15 and is rotated by said sleeve. The shaft 22 is movable longitudinally in the sleeve 15 by means of a feed shaft 24, mounted in a threaded sleeve 26, rotatably mounted in the bearing block 10. Said threaded sleeve 26 engages the screw thread upon the feed shaft 24 and moves said shaft longitudinally when the sleeve 26 is rotated by means of a gear wheel 28, secured on the sleeve 26, and rotated by a small pinion 30, secured on said shaft 18 rotated by said motor 20.

The feed shaft 24 is detachably secured to the square shaft 22 by means of a coupling 32, provided for allowing the square shaft 22 to revolve independently of the feed shaft 24, and at the same time allow the feed shaft 24 to move the square shaft 22 longitudinally through the sleeve 15. Said shaft 24 is held against rotation by means of a key 34 adapted to enter a longitudinal slot formed in the feed shaft 24. The square shaft 22 is provided upon its opposite end with a socket or chuck 36 for detachably holding a mandrel 40 adapted for entering the bearing 5 which is to be operated upon.

The mandrel 40 is provided with a conical portion 41 which is suitable for entering the bearing 5 having an opening of a relatively small diameter than the mandrel through which the mandrel is forced for increasing the diameter of said opening. The mandrel 40 is also provided with a cylindrical portion 42 which is made the proper diameter for forming a finished opening of the desired size in the bearing 5.

The mandrel 40 is of hollow construction and open at its smaller end to receive a hollow shaft, forming an arbor 45, upon which the mandrel 40 is free to slide longitudinally and also revolve, whereby the mandrel is steadied by the arbor 45. Said shaft 45 is secured in a bearing block 46, adjustably mounted upon the bed plate 1. The shaft or arbor 45 is provided with a fuel burner 47 for supplying heat through the central aperture of the arbor 45, for heating the mandrel 40.

The clamp member or box 3 consists of a base 50, which is slidably mounted upon the bed plate 1, to which latter it may be secured in a fixed position by a clamping device 51. The base 50 is provided with four perpendicular walls 52, 53, 54 and 55 forming a box construction which is open at the top and adapted to receive the bearing 5 which is to be treated.

The opposite walls 52 and 53 of the clamp box 3 are provided with openings 56 through which the mandrel 40 may freely pass. The clamp box 3 is adapted to receive upper and lower sections of clamp plates 58 and 59. Said plates 58 and 59 are adapted to tightly embrace the square ends 5a of the bearing 5 and prevent said bearing from rotating within the clamp box 3. Said clamp plates 58 and 59 are also provided with inner cylindrical walls 60 adapted to embrace the cylindrical portion 5b of the bearing 5 and prevent the latter from expanding when the conical mandrel is forced through the bearing 5. The inner and outer walls of the clamp plates 58 and 59 are strengthened by webs 61, located in the heat chambers 62, formed between said inner and outer walls of the clamp plates, which latter are also provided with openings 64 for the circulation of the heat.

Filling plates 65 and 66 are provided to take up any space in the clamp box when the clamp plates are not of a sufficient size to fill the clamp box. By this arrangement bearings of different sizes may be secured within the clamp box 3 by using clamp plates corresponding to the size of the bearing which is to be treated and then inserting the filling plates of the proper thickness to take up any remaining space between the clamp plates and the clamp box. The end walls 52 and 53, of the clamp box 3, are adapted to take the end thrust of the mandrel and hold the bearing in a fixed position.

The base plate 50 of the clamp box 3 is provided with a chamber 75 to which heat is supplied from the fuel burner 67. The heat passes from the chamber 75 through the openings 64 into the chambers 62 formed within the clamp plates, thus heating the bearing 5.

The clamp plates 58 and 59 are divided into two sections, adapting them to be readily inserted and removed from around the bearing 5, which latter may be either of the solid type, or made in two sections, as shown in the drawings. The frame or bed plate 1 is of sufficient length to permit the mandrel 40 to be entirely withdrawn from the clamp box 3 by means of the feed shaft 24, or by moving the clamp box 3 longitudinally upon the bed plate. The mandrel 40 is provided with a conical shank 70 which is smaller in diameter than the cylindrical portion 42 of the mandrel, permitting the mandrel to be passed entirely through the bearing 5, by detaching the mandrel from the chuck 36, thus avoiding the necessity of making a change in the direction of travel of the mandrel through the bearing 5.

The operation of my invention is as follows; a bearing 5, is secured within the clamp box 3, and heat is applied to the chamber 62 and 65 for heating the bearing 5 to a temperature slightly below the melting point of the metal of which the bearing is formed and also by applying heat through the burner 47 for heating the mandrel 40. By the operation of the motor 20 the shaft 22 and the mandrel 40 are revolved at a high speed, and the mandrel is advanced slowly into the bearing 5 by means of the feed shaft 24. A mandrel of suitable size is used according to the size of the bearing 5, whereby the smaller end of the mandrel 40 will just enter the central opening through said bearing.

The rotating motion of the smooth conical surface of the mandrel will enlarge the central opening through the bearing and compress the metal of which the bearing is formed, this operation is continued until the cylindrical portion of the mandrel has passed entirely through the bearing, thus providing the latter with a central opening of a diameter equal to the diameter of the mandrel and forming a perfectly smooth inner surface upon the bearing and also causing the metal of the bearing to have a greater density due to the fact that the metal has been compressed instead of being cut-away, as in the usual method of fitting bushings by boring and scraping. The mandrel may be removed from the bearings by either withdrawing the mandrel or detaching it from the chuck 36 and passing it entirely through the bearing.

I claim:—

1. A bearing and bushing finishing apparatus comprising a clamp member, a rotatable mandrel, a bed plate upon which the mandrel and clamp member are operatively movable relatively to each other, said clamp member having a base plate adjustably mounted upon said bed plate, walls upon said base plate forming a clamp box to receive said bearing, said walls having an opening formed therethrough for the passage of the mandrel, sectional clamp plates within the clamp box adapted to embrace said bearing for rigidly holding the latter within the walls of the clamp member, said clamp member having a heating chamber formed therein, means for supplying heat to said chamber for heating the bearing, one of said clamp plates having apertures formed therein for the free passage of heat to the bearing, means for rotating the mandrel, and means for moving the mandrel axially through the bearing.

2. A bearing and bushing finishing apparatus comprising a clamp member, a rotatable mandrel, a frame member upon which the mandrel and clamp member are operatively movable relatively to each other, said clamp member having a base plate adjustably mounted upon said frame member, walls upon said base plate forming a clamp box to receive said bearing, said walls having an opening formed therethrough for the passage of the mandrel, sectional clamp plates within the clamp box having inner and outer walls forming heat chambers, said inner walls of the clamp plates having annular inner surfaces adapted to surround the bearing, said clamp plates having openings therein for the circulation of heat, means for supplying heat through the clamp plates for heating the bearing, means for rotating the mandrel, and means for moving the mandrel axially through the bearing.

3. A bearing and bushing finishing apparatus comprising a frame, a clamp member mounted upon said frame adapted for rigidly holding the bearing which is to be finished, a bearing-block adjustably mounted upon the frame, a mandrel having one end thereof rotatably mounted in the bearing-block, means for moving the mandrel longitudinally in the bearing-block relatively to said frame, said clamp member having openings formed in opposite walls thereof through which the mandrel may pass and enter said bearing which is to be finished, said mandrel having an axial opening formed therein extending to the end thereof opposite to said bearing block, a second bearing block mounted upon the frame and located adjacent to the end of the mandrel opposite to the first mentioned bearing block, a hollow shaft mounted in said second bearing block, said hollow shaft extending into said axial opening formed in the mandrel forming means for steadying the latter, and means for supplying heat through said hollow shaft into the mandrel for heating the latter.

In testimony whereof I affix my signature.

THOMAS DAVID BOWES.